United States Patent
Arndt et al.

(10) Patent No.: US 6,950,978 B2
(45) Date of Patent: Sep. 27, 2005

(54) METHOD AND APPARATUS FOR PARITY ERROR RECOVERY

(75) Inventors: Richard Louis Arndt, Austin, TX (US); Alongkorn Kitamorn, Austin, TX (US); Edward John Silha, Austin, TX (US); Scott Douglas Walton, Pflugerville, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 09/821,061

(22) Filed: Mar. 29, 2001

(65) Prior Publication Data

US 2003/0023932 A1 Jan. 30, 2003

(51) Int. Cl.[7] .......................... G06F 11/00; H03M 13/00
(52) U.S. Cl. ........................................ 714/800; 714/2
(58) Field of Search ............................... 714/2, 25, 48, 714/724, 799–805, 10, 811

(56) References Cited

U.S. PATENT DOCUMENTS

| | | | | |
|---|---|---|---|---|
| 5,659,678 A | * | 8/1997 | Aichelmann et al. | 714/25 |
| 6,012,148 A | * | 1/2000 | Laberge et al. | 714/2 |
| 6,014,756 A | * | 1/2000 | Dottling et al. | 714/15 |
| 6,332,181 B1 | * | 12/2001 | Bossen et al. | 711/155 |
| 6,445,717 B1 | * | 9/2002 | Gibson et al. | 370/473 |
| 6,615,374 B1 | * | 9/2003 | Moran | 714/48 |
| 6,625,749 B1 | * | 9/2003 | Quach | 714/10 |
| 6,625,756 B1 | * | 9/2003 | Grochowski et al. | 714/17 |
| 2002/0188895 A1 | * | 12/2002 | Quach et al. | 714/48 |

* cited by examiner

*Primary Examiner*—Albert Decady
*Assistant Examiner*—Cynthia Britt
(74) *Attorney, Agent, or Firm*—Duke W. Yee; Mark E. McBurney; Lisa L.B. Yociss

(57) ABSTRACT

A method, apparatus, and computer implemented instructions for processing and recovering from soft errors in computer array with a parity error checking design in a data processing system. In response to an occurrence of a parity error, processor status information is stored to form stored processor information. A determination is made as to whether the parity error is a recoverable parity error using the stored processor information. In response to the parity error being a recoverable parity error, a recovery action is performed. The specific action taken varies depending on the type of error.

32 Claims, 3 Drawing Sheets

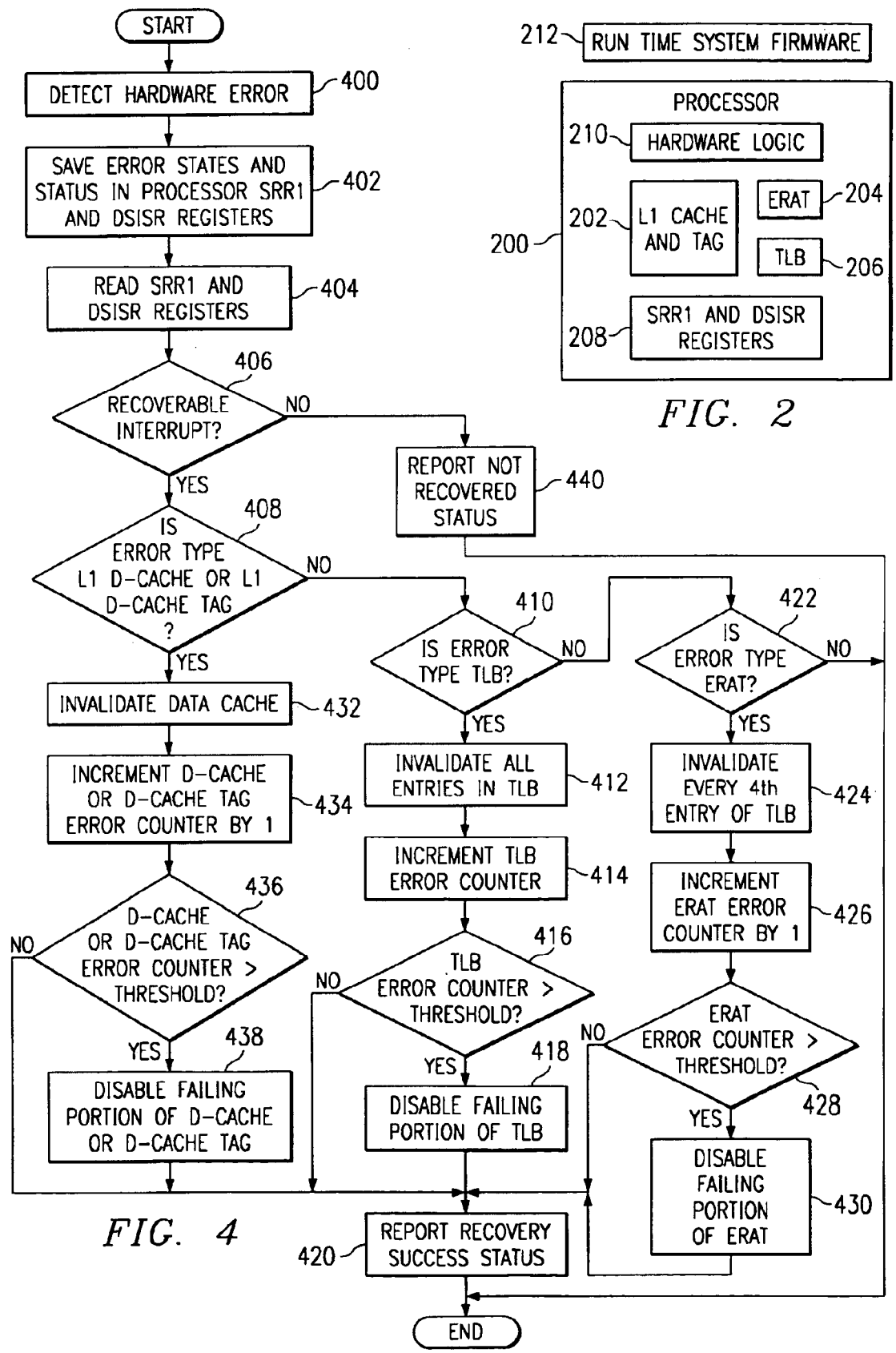
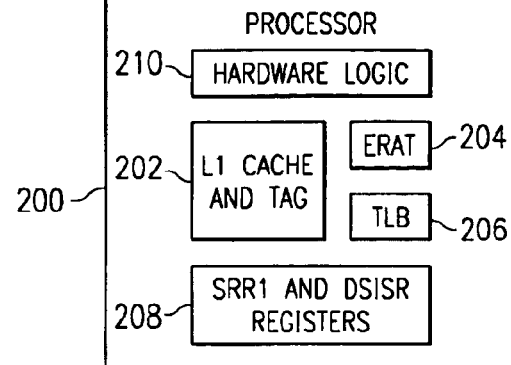
FIG. 2
FIG. 4

FIG. 3

| | 302 | 304 | 306 | 308 | 310 |
|---|---|---|---|---|---|
| | ERROR DESCRIPTION | HARDWARE INDICATION | FIRMWARE RECOVERY | LOG RETURN SEVERITY | LOG RETURN RTAS DISPOSITION |
| 312 | - LOST HW STATES | SRR1[RI] = 0 | NONE | FATAL (ERROR NOT SYNCHRONOUS TO CURRENT CONTEXT) | NOT RECOVERED |
| 318 | - D-CACHE PARITY<br>- D-CACHE TAG PARITY UNDER THRESHOLD | SRR1[RI] = 1 AND<br>SRR1[43] = 1 AND<br>DSISR[18/19] = 1 | INVALIDATE D-CACHE | WARNING | FULLY RECOVERED |
| 320 | - D-CACHE PARITY<br>- D-CACHE TAG PARITY OVER THRESHOLD | SRR1[RI] = 1 AND<br>SRR1[43] = 1 AND<br>DSISR[18/19] = 1 | - INVALIDATE D-CACHE<br>- DISABLE FAILING PORTION OF D-CACHE | WARNING | FULLY RECOVERED |
| 322 | - L/S TLB PARITY<br>- L/S D-ERAT PARITY UNDER THRESHOLD | SRR1[RI] = 1 AND<br>SRR1[43] = 1 AND<br>DSISR[20/21] = 1 | INVALIDATE TLB ALL | WARNING | FULLY RECOVERED |
| 314 | - L/S TLB PARITY<br>- L/S D-ERAT PARITY OVER THRESHOLD | SRR1[RI] = 1 AND<br>SRR1[43] = 1 AND<br>DSISR[20/21] = 1 | INVALIDATE TLB ALL, DISABLE FAILING PORTION OF ERAT OR TLB | WARNING | FULLY RECOVERED |
| 324 | - IFETCH TLB PARITY UNDER THRESHOLD | SRR1[RI] = 1 AND<br>SRR1[44:45] = 10 | INVALIDATE TLB ALL | WARNING | FULLY RECOVERED |
| 316 | - IFETCH TLB PARITY OVER THRESHOLD | SRR1[RI] = 1 AND<br>SRR1[44:45] = 10 | INVALIDATE TLB ALL, DISABLE FAILING PORTION OF TLB | WARNING | FULLY RECOVERED |

METHOD AND APPARATUS FOR PARITY ERROR RECOVERY

BACKGROUND OF THE INVENTION

1. Technical Field

The present invention relates generally to an improved data processing system, and in particular to a method and apparatus for processing errors in a data processing system. Still more particularly, the present invention provides a method, apparatus, and computer implemented instructions for parity error recovery.

2. Description of Related Art

In presently available computer systems, error detection logic and parity are used to ensure customer data integrity. Error detection involves testing for accurate storage, retrieval and transmission of data internally within the computer system. Parity checking is an error detection technique that tests the integrity of digital data within the computer system or over a network. Parity checking uses an extra ninth bit that holds a 0 or 1 depending on the data content of the byte. Each time a byte of data is retrieved, transferred or transmitted, the parity bit is tested. Even parity systems make the parity bit 1 when there is an even number of 1 bits in the byte. Odd parity systems make it 1 when there is an odd number of 1 bits. A parity error is an error condition that occurs when the parity bit of a character is found to be incorrect. For example, if the number of set bits is even, it sets the parity bit to 0; if the number of set bits is odd, it sets the parity bit to 1. In this way, every byte has an even number of set bits. When the data is checked, each byte is checked to make sure that it has an even number of set bits. If an odd number of set bits are present, an error has occurred. This check is typically made each time data is read from the storage device.

Today, computer systems use a large quantity of semiconductor memory for temporary data storage within the system. The types of temporary data storage includes a 1st level instruction (L1 I-Cache) and data cache (L1 D-Cache), a second level cache (L2), a third level cache (L3), a effective to real address translation (ERAT) buffer, translation lookaside buffer (TLB), and main memory. The smaller size memory within the system, such as L1, ERAT, or TLB are generally referred to as an array.

The large quantity of array or memory used in today's computer system also brings higher failure rates to the overall system. Semiconductor array or memory failures include solid and soft errors. Solid errors are those errors caused by imperfect manufacturing process or reliability wear out. Soft errors are those errors caused by alpha particle, cosmic ray or electrical noise within the computer system. Soft errors are transient errors. In general, soft errors in semiconductor array or memory are magnitudes higher than solid errors.

In some cases, computer hardware with a high failure rate, such as L2, L3, or system memory, uses error correction logic to minimize the impact of a failure of the system and improve overall system availability. Error correction logic, however, adds to the cost and additional circuit delay. As a result, the cost of systems and overall system performance may be reduced.

Therefore, it would be advantageous to have an improved method, apparatus, and computer implemented instructions for recovering from soft errors in the computer array with parity errors checking in a data processing system.

SUMMARY OF THE INVENTION

The present invention provides a method, apparatus, and computer implemented instructions for processing and recovering from soft errors in computer array with a parity error checking design in a data processing system. In response to an occurrence of a parity error, processor status information is stored to form stored processor information. A determination is made as to whether the parity error is a recoverable parity error using the stored processor information. In response to the parity error being a recoverable parity error, a recovery action is performed. The specific action taken varies depending on the type of error.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of components involved in array parity recovery in accordance with a preferred embodiment of the present invention;

FIG. 3 is a table illustrating errors and actions in accordance with a preferred embodiment of the present invention; and FIG. 4 is a flowchart of a process used for recovering from a parity error in accordance with a preferred embodiment of the present invention.

DETAILED DESCRIPTION OF THE PREFERRED EMBODIMENT

Figure 1:
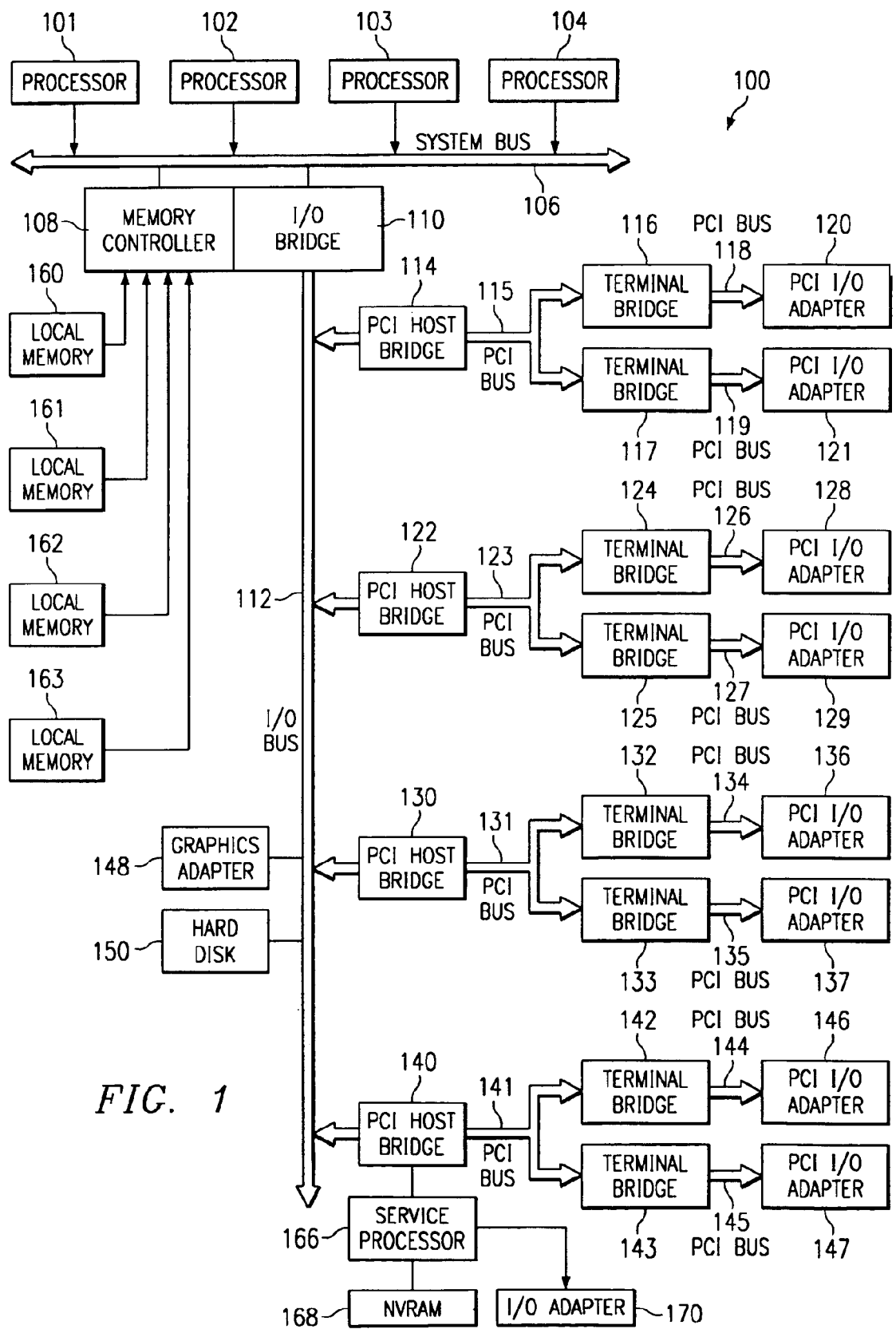
FIG. 1 is a block diagram of a data processing system in which the present invention may be implemented.

With reference now to the figure and in particular with reference to FIG. 1, a block diagram of a data processing system in which the present invention may be implemented. In this example, data processing system 100 may be a symmetric multiprocessor (SMP) system including a plurality of processors 101, 102, 103, and 104 connected to system bus 106. For example, data processing system 100 may be an IBM eServer pSeries (formerly known as RS/6000), a product of International Business Machines Corporation in Armonk, N.Y. Alternatively, a single processor system may be employed. Also connected to system bus 106 is memory controller, 108 which provides an interface to a plurality of local memories 160–163. I/O bus bridge 110 is connected to system bus 106 and provides an interface to I/O bus 112. Memory controller 108 and I/O bus bridge 110 may be integrated as depicted. Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136–137, and 146–147 may be assigned to different logical partitions.

Suppose, for example, data processing system 100 is divided into three logical partitions, P1, P2, and P3. Each of I/O adapters 120–121, 128–129, 136–137, and 146–147 each of processors 101–104, and each of local memories 160–163 are assigned to one of the three partitions. For example, processor 101, memory 160, and I/O adapters 120, 128, and 129 may be assigned to logical partition P1; processors 102–103, memory 161, and I/O adapters 121 and 137 may be assigned to partition P2; and processor 104, memories 162–163, and I/O adapters 136 and 146–147 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI bus 115. A number of terminal bridges 116–117 may be connected to PCI bus 115. Typical PCI bus implementations will support four terminal bridges for providing expansion slots or add-in connectors. Each of terminal bridges 116–117 is connected to a PCI I/O adapter 120–121 through PCI Bus 118–119. Each I/O adapter 120–121 provides an interface between data processing system 100 and input/output devices such as, for example, other network computers, which are clients to server 100. Only a single I/O adapter 120–121 may be connected to each terminal bridge 116–117. Each of terminal bridges 116–117 is configured to prevent the propagation of errors up into the PCI Host Bridge 114 and into higher levels of data processing system 100. By doing so, an error received by any of terminal bridges 116–117 is isolated from the shared buses 115 and 112 of the other I/O adapters 121, 128–129, 136–137, and 146–147 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 122, 130, and 140 provide interfaces for additional PCI buses 123, 131, and 141. Each of additional PCI buses 123, 131, and 141 are connected to a plurality of terminal bridges 124–125, 132–133, and 142–143, which are each connected to a PCI I/O adapter 128–129, 136–137, and 146–147 by a PCI bus 126–127, 134–135, and 144–145. Thus, additional I/O devices, such as, for example, modems or network adapters may be supported through each of PCI I/O adapters 128–129, 136–137, and 146–147. In this manner, server 100 allows connections to multiple network computers. A memory mapped graphics adapter 148 and hard disk 150 may also be connected to I/O bus 112 as depicted, either directly or indirectly.

Management of logical partitions is achieved through terminals, such as hardware system consoles (HSC). This access is provided in these examples through service processor 166, nonvolatile random access memory (NVRAM) 168, and input/output (I/O) adapter 170. HSCs connect to service processor 166 through I/O adapter 170. NVRAM 168 contains objects, such as profiles used to configure and manage logical partitions within data processing system 100. In these examples, the profiles stored in NVRAM 168 are sent to HSCs as they come online or connect to data processing system 100 through I/O adapter 170. This architecture provides a mechanism to avoid having to store profiles for logical partitions at the HSCs. Further, synchronization mechanisms to maintain profiles duplicated at different HSCs also are not required with this architecture.

In the depicted examples, processors 101–104 include data caches, such as a level 1 (L1) data cache. A cache is used to speed up data transfer and may be either temporary or permanent. In this example, the L1 data cache is a permanent located within a processor. Instructions and data are transferred to the cache in blocks, using some kind of look-ahead algorithm. The more sequential the instructions in the routine being accessed, and the more sequential the order of the data being read, the more chance the next desired item will still be in the cache, and the greater improvement in performance.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The mechanism of the present invention relates to error recovery in data caches and other components associated with processors, such as a translation lookaside buffer (TLB) or effective to real address translation (ERAT). These small memories in the processor are generally referred to as array. Currently, detection of a parity error causes a system crash. The mechanism of the present invention is designed to allow for recovery from parity errors in these arrays. The mechanism involves a runtime system firmware in an interrupt routine, which includes a recovery process or algorithm. This process reads the save and restore registers 1 (SRR1) and data storage interrupt status register (DSISR) in the processor and uses this information to determine if the error is a recoverable error. If the error is a recoverable error, an action is taken depending on the type of error. For example, if the error is an instruction fetch TLB error, then the entries in the TLB are invalidated and an error count is incremented. If the error count exceeds a selected threshold, then a different action may be taken.

Turning next to FIG. 2, a block diagram of components involved in parity error recovery is depicted in accordance with a preferred embodiment of the present invention. In this example, processor 200 includes an L1 cache and tag 202, an effective to real address translation (ERAT) unit 204, a translation lookaside buffer (TLB) 206, SRR1 and DSISR registers 208, and hardware logic 210. L1 cache, tag, ERAT and TLB are generally referred to as processor array. Runtime system firmware 212 implements an interrupt routine containing a recovery algorithm used with parity errors in these arrays. Runtime system firmware 212 is a set of computer instructions produced by computer hardware manufacturer to implement a specific computer function. In this case, the system firmware is written specifically for error recovery in these processor arrays. The runtime firmware is executing processor instructions on the processor with array parity error. This mechanism will read SRR1 and DSISR registers 208 in processor 200. The information from these registers is used to determine whether the error is a recoverable error. Upon identifying a recoverable error, different actions are taken depending on the type of error.

Turning next to FIG. 3, a table illustrating errors and actions is depicted in accordance with a preferred embodiment of the present invention. Table 300 identifies different errors and actions to be taken. The error description is found in column 302, the hardware indicator (i.e. content of SRR1 and DSISR registers for the column) is found in column 304. Firmware recovery actions, if any, are identified in column 306. The severity of the error is found in column 308 and the disposition of the error as to whether a recovery has occurred is found in column 310. Both severity and disposition information are contained in the error log informing the operating system of the recovery status. In these examples, entry 312 is an entry for error in which a recovery does not occur. This error includes a loss of hardware states. When this type of error occurs, the system or a logical partition in a partitioned system does not recover and must be restarted.

Entries 314–324 identify errors in which a recovery may occur. These errors include data cache parity errors and data cache tag parity errors; load/store (L/S) TLB parity errors and L/S data ERAT parity errors; and load/store (L/S) TLB parity errors and L/S data ERAT parity errors. The actions in these types of errors include invalidated the content of a cache, an ERAT or a TLB. Additionally, these entries in which recoveries may occur identify action to take depending on whether a threshold in an error count has been met or exceeded. For example, in entry 318 when an error count is less than or equal to a threshold, the data cache is invalidated. If the threshold has been exceeded, entry 320 indicates that for a data cache parity error that the data cache is to be both invalidated and the failing portion of a cache is disabled.

Turning now to FIG. 4, a flowchart of a process used for recovering from a parity error is depicted in accordance with a preferred embodiment of the present invention. The process illustrated in FIG. 4 may be implemented as a runtime system firmware machine check interrupt routine executing computer instructions. In these examples, steps 404 to 440 are implemented as runtime system firmware executing computer instructions on a processor with detected parity errors. The runtime system firmware machine check interrupt routine prevent the system from crashing when a parity error occurs by executing error recovery algorithm.

The process begins when a parity error is detected by hardware error detection logic (step 400). Upon detecting a hardware error, the specific error type and processor recoverable interrupt state are saved in the processor SRR1 and DSISR register, and a hardware branch of the instruction to the machine check interrupt vector at address 0x0200 occurs (step 402). Step 402 is performed by hardware logic. In these examples, the error status registers are SRR1 and DSISR. These hardware state and status registers, SRR1 and DSISR, are then read (step 404). A determination is made as to whether the interrupt is a recoverable one (step 406). In the depicted examples, a determination is made by reading the processor SRR1 register and check if RI bit within the SRR1 register is set to the value of 1.

If the interrupt is a recoverable one (SRR1 [RE]=1), a determination is made as to whether the error type is an L1 D-cache or an L1 D-cache tag (step 408). If this error type is not present, then a determination is made as to whether the error type is a TLB error (step 410). If the answer to this determination is yes, all TLB entries are invalidated (step 412), and a TLB error counter, is incremented by 1 (step 414).

Next, a determination is made as to whether the TLB error counter is greater than a threshold (step 416). An error threshold is predetermined during design phase by setting it significantly higher than the projected soft error rate of an array over the life time of the product. In this case, a threshold of 5 is chosen. If an error threshold for a particular array (L1 D-cache, TLB or ERAT) is reached, it means that the error encountered is solid, and invalidating the content of the array will not remove the soft error. If the TLB error counter is greater than the threshold, the failing portion of the TLB is disabled by changing a specific value in the Hardware Implementation Dependent (HID) Register (step 418). A recovery success status is reported (step 420) to the interrupted operating system software via a callback mechanism, with the process terminating thereafter. The operating system software check the error log for recovery status and resume operation. Turning back to step 416, if the error count is not greater than the threshold, the process proceeds to step 420, as described above.

With reference back to step 410, if the error type is not TLB, then a determination is made as to whether the error type is an ERAT error step (422). If the answer to this determination is yes, every forth TLB entries are invalidated (step 424) and an ERAT error counter is incremented by 1 (step 426). Next, a determination is made as to whether the ERAT error counter is greater than a threshold (step 428). If the ERAT error counter is greater than the threshold, the failing portion of the ERAT unit is disabled by changing a specific value in the hardware implementation dependent (HID) register (step 430) with the process proceeding to step 420 as described above.

Turning again to step 428, if the error counter does not exceed the threshold, the process proceeds to step 420. With reference back to step 422, if the error type if not an ERAT type error, the process terminates.

Turning back to step 408, if the error type is an L1 data cache or an L1 data cache tag, the data cache is invalidated (step 432). A D-Cache or D-Cache tag error counter is incremented by 1. (step 434). Then, a determination is made as to whether the D-Cache or D-Cache tag error counter has exceeded the threshold (step 436). The threshold is the same threshold value as in step 416, but for a different counter. If the threshold has been exceeded, then the failing portion of the D-cache or D-cache tag is disabled (step 438) with the process proceeding to step 420 as described above.

With reference again to step 436, if the D-Cache or D-Cache tag error counter has not exceeded the threshold, the process also proceeds to step 420 as described above.

Turning back to step 406, if the machine check interrupt is not a recoverable one, a not recovered status is reported to the interrupted operating system software via a callback mechanism (step 440) with the process terminating thereafter. In step 440, the operating system proceeds with its recovery or terminating process.

Thus, the present invention provides an improved method, apparatus, and computer implemented instructions for handling processor array parity errors in which a system failure does not necessarily occur in response to this type of error. The mechanism of the present invention includes a routine or process that reads selected registers in the processor to determine whether the error is a recoverable error. If the error is a recoverable error, an action is taken based on the type of error.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for preventing said system from crashing when a parity error occurs in a cache that is associated with a processor included in said system and for processing said parity error during runtime of said system, the method comprising:

responsive to an occurrence of a parity error in said cache that is associated with said processor, storing a single set of processor information, that indicates an error type, error states, and error status that are stored in said processor as a result of said occurrence of said parity error, in registers in said processor to form stored processor information;

determining whether the parity error is a recoverable parity error using the stored processor information by reading said registers to analyze said stored error type, error states, and error status; and responsive to the parity error being a recoverable parity error, performing a recovery action.

2. The method of claim 1, wherein the performing step comprising:

if said error type for the parity error is one of a level one data cache error or a level one cache tag error, incrementing an error count associated with the error type and invalidating the level one data cache; and if the error count associated with the error type is greater than a threshold, disabling the failing portion of the level one data cache or data cache tag.

3. The method of claim 1, wherein the performing step comprises:

if said error type is a translation lookaside buffer error, incrementing a translation lookaside buffer error count and invalidating all entries in a translation lookaside buffer.

4. The method of claim 3, wherein the performing step further comprises:

if the translation lookaside buffer error count is greater than a threshold, disabling the failing portion of the translation lookaside buffer.

5. The method of claim 1, wherein the performing step comprises:

if said error type is an effective to real address translation error, incrementing an error count and invalidating selected entries within a translation lookaside buffer.

6. The method of claim 5, wherein the selected entries are every fourth entry within the translation lookaside buffer.

7. The method of claim 5, wherein the performing step further comprises:

if the effective to real address translation error count is greater than a threshold, disabling the failing portion of the effective to real address translation unit.

8. The method of claim 1, wherein the stored processor information includes at least one error state.

9. The method of claim 1 further comprising:

if the parity error is a non-recoverable parity error, generating an indication of the non-recoverable interrupt error and storing said indication in said registers.

10. A data processing system comprising:

a bus system;

a communications unit connected to the bus system;

a memory connected to the bus system, wherein the memory includes a set of instructions; and a processing unit connected to the bus system, wherein the processing unit includes registers for storing a single set of processor information that indicates an error type, error states, and error status to form stored processor information in response to the detection of a parity error in said cache that is associated with said processor; branch to the machine check interrupt vector, a runtime system firmware executes by the processing unit at the interrupt vector to determine whether the parity error is a recoverable parity error using the stored processor information by reading said registers to analyze said stored error type, error states, and error status; and perform a recovery action in response to the parity error being a recoverable parity error.

11. The data processing system of claim 10, wherein the bus system is a single bus.

12. The data processing system of claim 10, wherein the bus system includes a primary bus and a secondary bus.

13. The data processing system of claim 10, wherein the processing unit includes a plurality of processors.

14. The data processing system of claim 10, wherein the communications unit is one of a modem and Ethernet adapter.

15. A data processing system for preventing crashing of said system when a parity error occurs in a cache that is associated with a processor included in said system and for processing a parity error, the data processing system comprising:

storing means, responsive to an occurrence of a parity error in said cache that is associated with said processor, for storing a single set of processor information, that indicates an error type, error states, and error status that are stored in said processor as a result of said occurrence of said parity error, in registers in said processor to form stored processor information;

determining means for determining whether the parity error is a recoverable parity error using the stored processor information by reading said registers to analyze said stored error type, error states, and error status; and performing means, responsive to the parity error being a recoverable parity error, for performing a recovery action.

16. The data processing system of claim 15, wherein the performing means comprises:

incrementing means, if said error type for the parity error is one of a level one data cache error or a level one cache tag error, for incrementing an error count associated with the error type and invalidating the level one data cache; and disabling means, if the error count is greater than a threshold, for disabling the failing portion of the level one data cache.

17. The data processing system of claim 15, wherein the performing means comprises:

means for incrementing a translation lookaside buffer error count and invalidating all entries in a translation lookaside buffer if said error type is a translation lookaside buffer error.

18. The data processing system of claim 17, wherein the performing means further comprises:

means for disabling the failing portion of the translation lookaside buffer if the error count is greater than a threshold.

19. The data processing system of claim 15, wherein the performing means comprises:

means for incrementing an effective to real address translation error count and invalidating selected entries within a translation lookaside buffer if said error type is an effective to real address translation error.

20. The data processing system of claim 19, wherein the selected entries are every fourth entry within the translation lookaside buffer.

21. The data processing system of claim 19, wherein the performing means further comprises:

means for disabling the failing portion of the effective to real address translation unit if the error count is greater than a threshold.

22. The data processing system of claim 15, wherein the stored processor information includes at least one error state.

23. The data processing system of claim 15 further comprising:

generating means for generating an indication of the non-recoverable interrupt if the parity error is a non-recoverable parity error and storing said indication in said registers.

24. A computer program product in a computer readable medium for preventing said system from crashing when a parity error occurs in a cache that is associated with a processor included in said system and for processing said parity error during runtime of said system, the product including the data processing implemented steps of:

responsive to an occurrence of a parity error in said cache that is associated with said processor, instructions for storing a single set of processor information, that indicates an error type, error states, and error status that are stored in said processor as a result of said occurrence of said parity error, in registers in said processor to form stored processor information;

instructions for determining whether the parity error is a recoverable parity error using the stored processor information by reading said registers to analyze said stored error type, error states, and error status; and responsive to the parity error being a recoverable parity error, instructions for performing a recovery action.

25. The product of claim 24, wherein the instructions for performing further comprises:

if said error type for the parity error is one of a level one data cache error or a level one cache tag error, instructions for incrementing an error count associated with the error type and invalidating the level one data cache; and if the error count associated with the error type is greater than a threshold, instructions for disabling the failing portion of the level one data cache or data cache tag.

26. The product of claim 24, wherein the instructions for performing further comprises:

if said error type is a translation lookaside buffer error, instructions for incrementing a translation lookaside buffer error count and invalidating all entries in a translation lookaside buffer.

27. The product of claim 26, wherein the instructions for performing further comprises:

if the translation lookaside buffer error count is greater than a threshold, instructions for disabling the failing portion of the translation lookaside buffer.

28. The product of claim 24, wherein the instructions for performing further comprises:

if said error type is an effective to real address translation error, instructions for incrementing an error count and invalidating selected entries within a translation lookaside buffer.

29. The product of claim 28, wherein the selected entries are every fourth entry within the translation lookaside buffer.

30. The product of claim 28, wherein the instructions for performing further comprises:

if the effective to real address translation error count is greater than a threshold, instructions for disabling the failing portion of the effective to real address translation unit.

31. The product of claim 24, wherein the stored processor information includes at least one error state.

32. The product of claim 24 further comprising:

if the parity error is a non-recoverable parity error, instructions for generating an indication of the non-recoverable interrupt error and instructions for storing said indication in said registers.

* * * * *